(12) United States Patent
Stevens

(10) Patent No.: US 7,998,512 B1
(45) Date of Patent: Aug. 16, 2011

(54) DOUGH-ENROBED FOODSTUFF

(75) Inventor: Cheree L. B. Stevens, Idaho Falls, ID (US)

(73) Assignee: Advanced Food Technologies, Inc., Grand Rapids, MI (US)

( * ) Notice: Subject to any disclaimer, the term of this patent is extended or adjusted under 35 U.S.C. 154(b) by 1480 days.

(21) Appl. No.: 11/333,681

(22) Filed: Jan. 17, 2006

Related U.S. Application Data

(60) Provisional application No. 60/644,242, filed on Jan. 14, 2005.

(51) Int. Cl.
*A23L 1/0522* (2006.01)
*A23L 1/216* (2006.01)

(52) U.S. Cl. .......... 426/94; 426/102; 426/283; 426/302; 426/303

(58) Field of Classification Search .................... 426/94, 426/303, 302, 283, 102
See application file for complete search history.

(56) References Cited

U.S. PATENT DOCUMENTS

| | | | |
|---|---|---|---|
| 3,424,591 A | 1/1969 | Gold | |
| 3,597,227 A | 8/1971 | Murray et al. | |
| 3,723,132 A | 3/1973 | Hodge et al. | |
| 3,751,268 A | 8/1973 | Van Patten et al. | |
| 4,053,650 A | 10/1977 | Chino et al. | |
| 4,066,796 A | 1/1978 | McKee | |
| 4,293,572 A | 10/1981 | Silva et al. | |
| 4,504,502 A | 3/1985 | Earle et al. | |
| 4,504,509 A | 3/1985 | Bell et al. | |
| 4,510,166 A | 4/1985 | Lenchin et al. | |
| 4,520,034 A | 5/1985 | Ishii et al. | |
| 4,551,340 A | 11/1985 | El-Hag et al. | |
| 4,710,228 A | 12/1987 | Seaborne et al. | |
| 4,790,997 A | 12/1988 | Friedman et al. | |
| 4,792,458 A | 12/1988 | Friedman et al. | |
| 4,828,847 A | 5/1989 | Thompson | |
| 4,913,919 A | 4/1990 | Cornwell et al. | |
| 5,004,616 A | 4/1991 | Shanbhag et al. | |
| 5,035,912 A | 7/1991 | Furcsik et al. | |
| 5,059,435 A * | 10/1991 | Sloan et al. ................... | 426/102 |
| 5,069,921 A * | 12/1991 | Madanat ....................... | 426/283 |
| 5,120,562 A | 6/1992 | Furcsik et al. | |
| 5,130,151 A | 7/1992 | Averbach | |

(Continued)

FOREIGN PATENT DOCUMENTS

CA 2101474 7/1993

(Continued)

OTHER PUBLICATIONS

84th AACC Annual Meeting Symposia and Reports, A. Jurgens, J.M. Maagd, and A.J. ten Dam, Oct. 31-Nov. 3, 1999.

(Continued)

*Primary Examiner* — Brent T O'Hern
(74) *Attorney, Agent, or Firm* — Price Heneveld LLP

(57) ABSTRACT

A dough-enrobed foodstuff is provided that contains a filling and is coated with a coating composition that includes a dextrin where less than 50% of the dextrin is soluble in about 25° C. (77° F.) water and modified food starch having an amylose content of less than 50% based on the weight of the modified food starch. The coated foodstuff is thermally processed such that the coating becomes substantially clear. The coated thermally processed foodstuff is then frozen. On reheating, the coated foodstuff is crispier than an uncoated, frozen foodstuff after reheating and substantially prevents the filling from breaking the dough-enrobed foodstuff upon reconstitution by subsequent thermal processing.

19 Claims, 1 Drawing Sheet

U.S. PATENT DOCUMENTS

| | | | |
|---|---|---|---|
| 5,141,759 A | | 8/1992 | Sloan et al. |
| 5,204,137 A | | 4/1993 | Slimak |
| 5,260,076 A | | 11/1993 | Furcsik et al. |
| 5,302,410 A | | 4/1994 | Calder et al. |
| 5,393,552 A | | 2/1995 | Busacker et al. |
| 5,431,944 A | | 7/1995 | Melvej |
| 5,439,697 A | | 8/1995 | Gonzalez-Sanz |
| 5,484,617 A | | 1/1996 | Tiffany |
| 5,492,707 A | | 2/1996 | Chalupa et al. |
| 5,622,741 A | | 4/1997 | Stubbs et al. |
| 5,626,893 A | | 5/1997 | Reddy |
| 5,648,110 A | | 7/1997 | Wu et al. |
| 5,750,168 A | | 5/1998 | Woerman et al. |
| 5,753,286 A | | 5/1998 | Higgins |
| 5,849,351 A | | 12/1998 | Higgins et al. |
| 5,885,639 A | * | 3/1999 | Judkins et al. ............ 426/303 |
| 5,897,898 A | | 4/1999 | Rogols et al. |
| 5,922,392 A | | 7/1999 | Kelly et al. |
| 5,928,693 A | | 7/1999 | Friedman et al. |
| 5,965,189 A | * | 10/1999 | Stevens et al. ............ 426/549 |
| 5,976,607 A | | 11/1999 | Higgins et al. |
| 5,988,048 A | | 11/1999 | Hunter et al. |
| 5,997,918 A | | 12/1999 | Melvej |
| 6,022,569 A | | 2/2000 | Rogols et al. |
| 6,080,434 A | | 6/2000 | Horn et al. |
| 6,086,928 A | | 7/2000 | Stevens et al. |
| 6,113,957 A | | 9/2000 | Mattinson et al. |
| 6,132,785 A | | 10/2000 | Collinge et al. |
| 6,159,521 A | | 12/2000 | Horn et al. |
| 6,197,363 B1 | | 3/2001 | Walter, Jr. et al. |
| 6,217,921 B1 | | 4/2001 | Lanner et al. |
| 6,265,005 B1 | | 7/2001 | Haverkos et al. |
| 6,288,179 B1 | | 9/2001 | Baur et al. |
| 6,635,294 B2 | | 10/2003 | Keijbets |
| 6,733,809 B2 | | 5/2004 | Zimmerman et al. |
| 6,896,915 B2 | | 5/2005 | Shi et al. |
| 6,899,906 B2 | | 5/2005 | Stevens et al. |
| 2002/0001643 A1 | | 1/2002 | Stevens et al. |
| 2002/0058099 A1 | * | 5/2002 | Stevens et al. ............ 426/618 |
| 2002/0119219 A1 | | 8/2002 | Doyle et al. |
| 2003/0044488 A1 | * | 3/2003 | Roskam et al. ............ 426/94 |
| 2004/0009272 A1 | * | 1/2004 | Lonergan et al. ............ 426/302 |
| 2004/0071832 A1 | * | 4/2004 | Stevens et al. ............ 426/94 |
| 2004/0071833 A1 | | 4/2004 | Stevens |
| 2004/0096548 A1 | * | 5/2004 | Stevens et al. ............ 426/94 |
| 2004/0146630 A1 | | 7/2004 | Roskam et al. |
| 2005/0079248 A1 | | 4/2005 | Stevens et al. |
| 2005/0202136 A1 | | 9/2005 | Stevens et al. |

FOREIGN PATENT DOCUMENTS

| | | |
|---|---|---|
| WO | 8501188 | 3/1985 |
| WO | 9421143 | 9/1994 |
| WO | 9600011 | 1/1996 |
| WO | 9742827 | 11/1997 |
| WO | 9746106 | 12/1997 |
| WO | 0028828 | 5/2000 |
| WO | 0065932 | 11/2000 |
| WO | 0069287 | 11/2000 |
| WO | 0156393 | 8/2001 |

OTHER PUBLICATIONS

Specialty-Corn Types, David V. Glover, Dept. of Agronomy, Purdue University, Oct. 1999.

Capolex B; Specialty Coatings for Snack Foods & Baked Goods, Centerchem, Inc., 1998.

Prior Art French Fry Batter Formula.

"Keeping the Crunch in Breakfast Cereals" by Kimberlee J. Burrington, Food Product Design Jun. 2001.

Igoe, Robert. Dictionary of Food Ingredients, Springer-Verlag, 2001, p. 83.

LrdRas. Flour-msg; flour as thickener, Sep. 4-5, 1998, p. 12 http://www.florilegium.org/files/FOOD-BREADS/flour-msg.html.

* cited by examiner

DOUGH-ENROBED FOODSTUFF

CROSS-REFERENCE TO RELATED APPLICATION

The present invention claims priority to U.S. Provisional Patent Application Ser. No. 60/644,242, filed on Jan. 14, 2005, entitled DOUGH-ENROBED FOODSTUFF, the disclosure of which is hereby incorporated by reference in its entirety.

BACKGROUND OF THE INVENTION

Numerous different types of edible food coatings are known. These include relatively heavy and thick coatings of various materials, such as bread crumbs and tempura batter, as well as various flour or starch-based coatings that are usually applied as a relatively thin batter thereby forming a much thinner coating, which can be substantially transparent after application to a foodstuff. After application, the thinner coatings are cooked, further cooked if parfried, or otherwise thermally processed. This latter type of coating is extensively used on commercially prepared French fry potatoes, where they are often referred to as "clear coats" due to their unobstrusive and, in some cases, virtually unnoticeable visual characteristic on the finished fry.

Frozen, parfried dough-enrobed foodstuffs such as pizza rolls, sandwich pockets, and other similar products are composed of a wet sauce or glaze-based filling surrounded by dough which has been sealed around the edges. In some cases, the foodstuff is usually parfried, then frozen, packaged, and sold to retailers. On the retail package, the manufacturer provides instructions for the consumer for reconstituting the dough-enrobed foodstuff. Different heating instructions are offered on the retail package depending on the heating method used—conventional oven, toaster oven, or microwave oven. Typically, products prepared by conventional and toaster oven methods have a somewhat crisp, tough texture, while products prepared by microwave ovens are, at best, only very slightly crisp and are also tough. With all three preparation methods, the resultant foodstuff becomes softer and more chewy-tough as cooling begins. For many years the food industry has searched for ways to obtain crisp textured foodstuffs, especially those foodstuffs prepared by microwave ovens. Traditionally, high amylose, flour-based coating compositions have been used to obtain crisp textured foodstuffs; however, high amylose ingredients tend to be expensive.

Some food manufacturers have resorted to using specialized packaging, called heat susceptors, to achieve a crisp surface texture, for example, HOT POCKETS® manufactured by Nestle Prepared Foods Company. Heat susceptors are metalized surfaces that are components of packages of food intended for microwave cooking. The heat susceptor absorbs the microwave energy and becomes extremely hot, promoting the browning and surface crispness of food. Because the temperatures required to brown or crisp food are extremely high (at times exceeding 260° C. (500° F.)), there is concern that packaging components, such as adhesives, polymers, paper, and degradation products of these components, may migrate into food.

Accordingly, there is a significant need for an easily and economically produced dough-enrobed foodstuff that has a crisp exterior and a moist interior upon reconstitution, especially reconstitution using a microwave oven.

SUMMARY OF THE INVENTION

The present invention generally relates to coating compositions applied to the external surface of a dough-enrobed foodstuff or incorporated into the dough prior to forming a dough-enrobed foodstuff, such as pizza rolls, sandwich pockets, and other similar products. The coating compositions are applied to the surface or incorporated into the dough of the dough-enrobed foodstuff prior to cooking and have a substantially clear appearance on such foodstuffs after frying or parfrying. On subsequent reconstitution, the dough-enrobed foodstuff has substantially increased crispness and tenderness. The dough-enrobed foodstuffs of the present invention are capable of achieving their enhanced organoleptic properties (including crispness and tenderness) when reconstituted in a microwave oven without the use of heat susceptors.

One embodiment of the present invention generally includes a dough-enrobed foodstuff at least partially coated with a coating composition that typically contains a dextrin, typically a dextrin where less than about 50% of the dextrin is soluble in about 25° C. (77° F.) water, and a modified food starch. Typically, the coating composition is at least substantially clear.

Another embodiment of the present invention includes a method of producing a foodstuff where the foodstuff is coated with a coating composition that typically contains a dextrin, typically a dextrin where less than about 50% of the dextrin is soluble in about 25° C. (77° F.) water, and a modified food starch.

The coated foodstuff is typically at least partially parfried or fried such that the coating composition becomes substantially clear. The coated foodstuff is then frozen and finish thermally processed. Usually, the parfried or fried foodstuff that has thereafter been frozen is packaged and shipped to the end consumer who then ultimately undertakes the first thermal processing in a conventional oven, toaster oven, or microwave oven.

These and other features, advantages and objects of the present invention will be further understood and appreciated by those skilled in the art by reference to the following specification, claims, and appended drawing.

DETAILED DESCRIPTION OF PREFERRED EMBODIMENT

Figure 1:
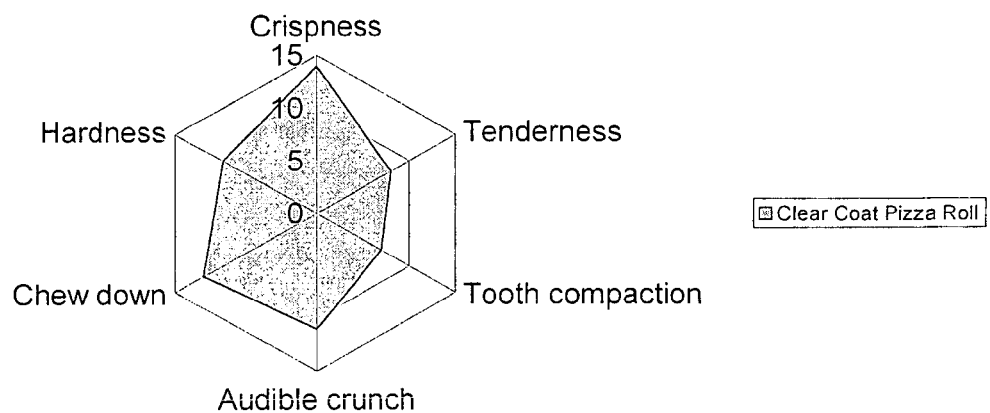
FIG. 1 is a Quantitative Descriptive Analysis (QDA) graph of coated pizza rolls of the present invention.

A dough-enrobed foodstuff of the present invention typically includes a coating composition at least partially coating, more typically substantially coating, the exterior surface of the dough-enrobed foodstuff. Typically, a coating composition of the present invention is substantially free of ingredients having an amylose content of more than 50% based on the weight of the ingredient. While not typically done because the benefits of the coating are lessened, the coating compositions of the present invention may be incorporated into the dough matrix prior to forming the dough-enrobed foodstuff and the finished dough-enrobed foodstuff is not subsequently also coated. At least partially (typically completely) coating the exterior of the foodstuff may also be done to the dough-enrobed foodstuff that also incorporates the coating composition into the dough matrix.

An embodiment of the coating composition of the present invention typically includes a modified food starch, a dextrin, and optionally, a rice flour, salt, and a stabilizer. The modified food starch used in the coating composition is typically a potato starch, a corn starch, a wheat starch, a tapioca starch, a rice starch, a pea starch, a cassava starch, or mixtures thereof.

Although it is presently believed that a modified wheat starch can be used, it is believed that oxidized and acetylated wheat starch is not suitable for use in a coating composition of the present invention. Additionally, the coating compositions of the present invention are preferably free of gluten, a protein found in the endosperm of certain grains, such as wheat. A growing number of people are diagnosed with wheat allergies or celiac disease, which require a wheat and/or gluten-free diet. Accordingly, gluten-containing ingredients, such as wheat starch, must be specially handled during processing to prevent cross-contamination with gluten-free ingredients. For example, special handling procedures for wheat-containing ingredients include separate storage and labor intensive and time consuming cleaning procedures for equipment after processing wheat-containing ingredients. Thus, a gluten-free coating composition of the present invention would be less expensive to manufacture and use.

Preferably, the modified food starch utilized in the coating composition of the present invention has an amylose content of less than about 50% based on the weight of the starch, more preferably, less than about 35%, and most preferably, an amylose content of about 25% or less based on the weight of the starch. The modified starch is typically a potato starch. The modified (chemically and/or physically) potato starch is typically present in the coating composition in an amount of from about 20% to about 100%, more typically from about 30% to about 60%, and most typically from about 45% to about 49% by weight of the coating composition. The modified potato starch primarily provides film formation properties. It is presently believed that potato starch may be modified by any industrial acceptable modification means, including, but not limited to, cross-linking and/or substitution. The modified food starch utilized in a coating composition of the present invention is typically not and does not typically contain a modified food starch that has been altered to enhance the amylose content of the modified starch. The coating composition is typically free of starches that have been altered to enhance their amylose content.

While the modified food starch of the coating composition of the present invention is typically in the amounts discussed above, Applicant has surprisingly discovered that, in another embodiment, larger amounts of from about 90% to about 95% modified food starch, typically a modified potato starch, corn starch, or combinations thereof as shown in Example 5 may be utilized with from about 4% to about 10% low amylose dextrin, typically corn dextrin. Salt in an amount of from about 1% to about 3% and from about 0.1% to about 0.3% of a stabilizer, such as xanthan gum, may also optionally be utilized.

In yet another embodiment, Applicant has also surprisingly discovered that the coating composition may comprise at least about 100% potato dextrin or at least about 100% of a tapioca starch, typically a pregelatinized and modified tapioca starch.

The dextrin utilized in coating compositions of the present invention such as the above described embodiment may include a corn dextrin, a tapioca dextrin, a potato dextrin, or any other commercially acceptable dextrin; however, a corn dextrin is most typically used. The corn dextrin is believed to provide superior film-forming functionality to the coating compositions over other dextrins when used to coat dough-based products. All dextrins are soluble to some degree; however, dextrins where less than about 50% of the dextrin is soluble when placed in or washed with cold water (approximately 25° C. (77° F.)) sufficient to solubilize all of the soluble dextrin, a process known by those of ordinary skill in the art, are preferred. Dextrins where less than about 32% of the dextrin is soluble when placed in or washed with cold water sufficient to solubilize all of the soluble dextrin are more preferred and dextrins where less than about 15% of the dextrin is soluble when placed in or washed with cold water sufficient to solubilize all of the soluble dextrin are the most preferred dextrins.

Typically, dextrin is present in coating compositions of the present invention in an amount of from about 20% to about 100%, more typically from about 30% to about 60%, and most typically from about 42% to about 46% dextrin by weight of the coating composition. While typically the dextrin is present in coating compositions of the present invention in amounts of from about 20% to about 100% as discussed above, Applicant has surprisingly discovered that dry coating the raw dough of a dough-enrobed foodstuff with a coating composition containing from about 90% to about 100% dextrin, typically about 100% potato dextrin, results in increased crispness after thermal processing.

Coating compositions of the present invention, including the above described embodiment, also typically include a rice flour. Typically, the rice flour is a rice flour having an amylose content of less than about 50% based on the weight of the rice flour, more typically, less than about 35%, and most typically, an amylose content of 19% or less based on the weight of the rice flour. Typically, the above described embodiment of the clear coat composition of the present invention includes a rice flour in an amount from 0% or about 0% to about 20%, more typically from about 4% to about 16%, and most typically from about 5% to about 7% rice flour by weight of the coating composition. Typically, at least a portion of rice flour includes rice flour of commercial mesh size for clear coating compositions, 80 U.S. Mesh or a combination of commercial rice flour for clear coatings and finer particle size rated rice flour components (preferably finer than about 100 U.S. mesh, more preferably finer than about 120 U.S. Mesh). More information about the particle size of the rice flour component or components is disclosed in U.S. Pat. No. 6,899,906 B2, which is hereby incorporated by reference in its entirety. More typically, the rice flour is a 120 U.S. Mesh size or smaller particle size rice flour.

Coating compositions of the present invention, including the above described embodiment, also typically include a stabilizer. The stabilizer may be natural or synthetic such as a gum, including but not limited to, xanthan gum, guar gum, CMC (carboxymethylcellulose), or mixtures thereof. When a stabilizer is utilized, the coating composition typically utilizes a xanthan gum such as KELTROL FT", available from Kelco Co. of Wilmington, Del. The xanthan gum or other stabilizer is typically present in an amount from 0% or about 0% to about 3%, more typically from about 0.05% to about 1%, and most typically from about 0.1% to about 0.2% stabilizer by weight of the coating composition.

Salt may also be used as a component of various coating compositions of the present invention. When utilized, salt is typically present in the clear coat composition in an amount of 0% or about 0% to about 10% by weight of the coating composition, more typically from about 1% to about 6% by weight of the coating composition, and most typically from about 2.5% to about 3.5% salt by weight of the coating composition.

The coating compositions of the present invention may be applied to the surface of the dough-enrobed foodstuff in the form of a wet slurry or in a dry coating form. The coating composition typically covers at least a portion of the external surface of the dough-enrobed foodstuff. More typically, substantially all or all of the external surface of the dough-enrobed foodstuff is coated with a coating composition of the present invention.

Coating compositions of the present invention may be applied as a wet slurry to the surface of a dough-enrobed foodstuff by any known method for applying slurry coating compositions to an edible substrate, including but not limited to, spray coating, dunk/drip bath, or by a waterfall application process. Applying the coating compositions in dry form to the surface of a dough-enrobed foodstuff may similarly be achieved by any known method for applying a dry coating composition to an edible substrate, including but not limited to, passing the dry composition through a sieve onto the surface of the dough-enrobed foodstuff.

When a coating composition of the present invention is applied in wet slurry form, the wet slurry coating composition is typically applied to the dough-enrobed foodstuff before the foodstuff has been thermally processed. When using a wet slurry application, typically the solids content ranges from about 5% to about 70% solids content, more typically from about 30% to about 55% by weight, and most typically about 45% to about 47% by weight of the wet slurry solids content. When a wet batter slurry of the present invention contains about 45% to about 47% by weight solids content, the remainder of the slurry coating composition is typically water or substantially water. The slurry viscosity is typically about 5 to about 40 Stein Cup seconds, more typically from about 8 to about 20 Stein Cup seconds, and most typically 11 Stein Cup seconds.

The Stein (top to first break in stream of slurry material) viscosity measurement is measured using the industry Stein testing procedure outlined below:
1. Completely fill a clean, dry Stein Cup with slurry (using a fingertip to act as a stopper to prevent the slurry from draining out the bottom of the cup hole);
2. Use the other hand to hang onto the wire handle of the Stein Cup and to hold the stopwatch;
3. Remove the finger covering the bottom cup hole and simultaneously start the stopwatch. Stop the watch when the slurry stream passing through the bottom cup hole first breaks the continuous stream;
4. Record the time in seconds; and
5. Repeat this procedure two additional times. Calculate the average of the three determinations and record.

The wet slurry coating composition is typically applied to the external surface of the dough-enrobed foodstuff at a temperature of from about 4.5° C. (40° F.) to about 38° C. (100° F.), more typically from about 13° C. (55° F.) to about 29° C. (85° F.), and most typically at about 21° C. (70° F.).

The pickup percentage of the coating composition in the form of a wet slurry by the dough-enrobed foodstuff measures the amount of coating composition that does not fall off the foodstuff after application. The percent pickup is calculated by dividing the difference between the weight of coated foodstuff and weight of uncoated foodstuff by the weight of uncoated foodstuff, multiplied by 100. When applied as a wet slurry, the percent pickup for wet slurry coating compositions of the present invention typically is from about 3% to about 30%, more typically from about 8% to about 20%, and most typically about 11%.

Alternatively, coating compositions of the present invention may also be applied to the dough-enrobed foodstuff in the form of a dry coating. The dry ingredients in the dry coating form of coating compositions of the present invention are typically the same or substantially similar to the ingredients in the wet slurry used to coat the external surface of a dough-enrobed foodstuff. Once the dry coating composition has been applied, the coated dough-enrobed foodstuff may be optionally water misted before thermal processing. Applying a water mist after the dry coating composition is applied facilitates adherence to the dough-enrobed foodstuff and results in a more continuous coating on the surface of the dough-enrobed foodstuff than if not water misted. It is believed that the more continuous coating is formed because the misting allows for partial solubilization of the dry coating composition.

A coating composition of the present invention is typically applied to the external surface of the dough-enrobed foodstuff; however, Applicant presently believes that the coating compositions may instead or additionally be incorporated into the matrix of the dough prior to forming the dough-enrobed foodstuff. If added to the dough matrix, a coating composition of the present invention is incorporated into the matrix of the dough before the foodstuff has been shaped and subsequently thermally processed. Typically, when a coating composition is incorporated into the raw dough, the percent of coating composition added is about 15% to about 25% by dry weight of the raw dough. Most dough-based foodstuff products have an open lattice dough structure and incorporate other ingredients, such as a coating composition of the present invention, very well. When incorporated directly into the dough-enrobed foodstuff dough matrix, substantially the same coating composition ingredients may be used, and may be introduced into the dough matrix in dry form or in the form of an aqueous slurry, adjusting the moisture content of the dough accordingly. At least partially coating the exterior of the foodstuff may also be done to the dough-enrobed foodstuff that incorporates the coating composition into the dough matrix.

Once the coating compositions have been applied to the surface of the dough-enrobed foodstuff in dry or wet form and/or incorporated into the matrix of the dough, the dough-enrobed foodstuff is subsequently thermally processed by frying. The dough-enrobed foodstuff may be fully fried; parfried; or parfried, coated, and then further fried. If baked, the coatings of the present invention will not adhere to the dough-enrobed foodstuff and are not substantially clear after baking. The time required to at least partially parfry a coated, dough-enrobed foodstuff depends on whether the dough-enrobed foodstuff has been previously fried or parfried. For example, when previously uncoated pizza rolls are taken from a retail package and coated with a coating composition of the present invention, they require less time to at least partially parfry the coated pizza roll than it would to at least partially parfry a coated raw dough-enrobed pizza roll.

Whether fully fried or parfried, when a previously thermally processed dough-enrobed foodstuff is coated with a coating composition of the present invention and processed, it is typically at least partially submerged in heated oil at a temperature of from about 93° C. (200° F.) to about 232° C. (450° F.) to at least partially parfry the coated foodstuff for about two seconds to about 90 seconds. More typically, the foodstuff is submerged in heated oil at a temperature of from about 163° C. (325° F.) to about 191° C. (375° F.) for about 10 seconds to about 60 seconds. Most typically, the foodstuff is submerged in heated oil at a temperature of about 185° C. (365° F.) for about 30 seconds.

Whether fully fried or parfried, raw dough-enrobed foodstuffs of the present invention are typically at least partially submerged in heated oil at a temperature of from about 179° C. (355° F.) to about 191° C. (375° F.) to thermally process for about 30 seconds to about 110 seconds, more typically submerged in heated oil at a temperature of about 185° C. (365° F.) for about 50 seconds. Surprisingly, Applicant has discovered that dough-enrobed foodstuffs coated with compositions of the present invention require less frying time than uncoated dough-enrobed foodstuffs. This reduces the amount of time the foodstuff is in contact with the hot oil, thus reducing the amount of moisture in the foodstuff that is exchanged for fat during the frying process. Additionally, a thermally processed dough-enrobed foodstuff coated with a coating composition of the present invention typically contains from about 5% to about 15% less fat than a thermally processed, uncoated dough-enrobed foodstuff.

The coating compositions of the present invention will set quickly, forming a matrix on the external surface of the dough-enrobed foodstuff when exposed to the heat utilized in at least partially parfrying or other frying as discussed herein. This matrix formation is largely due to flashing. Flashing is typically the exodus of free water from a coated dough-enrobed foodstuff upon being subjected to a sudden and substantial increase in the environmental temperature. The water contained in a wet batter slurry composition is generally unbound free water. When a wet slurry composition is applied to the external surface of a dough-enrobed foodstuff, the unbound water evaporates from the coating composition and flashes off. This is also the case when a coating composition in dry form is dusted onto the external surface of a dough-enrobed foodstuff and subsequently misted and then at least partially parfried. This flashing occurs during the time it takes the matrix of the coating composition to set. The time it takes for a coating composition of the present invention to set and form a matrix on the exterior surface of a dough-enrobed foodstuff is typically from about 5 seconds to about 20 seconds, and more typically from about 10 seconds to about 15 seconds.

After at least partially parfrying, the dough-enrobed foodstuff may be frozen and subsequently packaged. On reconstitution in a toaster oven, conventional oven, microwave oven, or fryer, the finished coated dough-enrobed foodstuff is crispier than conventional uncoated, reconstituted dough-enrobed foodstuffs. The coated dough-enrobed foodstuffs of the present invention have markedly improved, among other factors, crispness when reconstituted in a microwave oven as compared to a similarly reconstituted, uncoated dough-enrobed foodstuff. On cooling, the reconstituted dough-enrobed foodstuff coated with the coating composition of the present invention is crispier and less tough than a cooled uncoated, reconstituted dough-enrobed foodstuff. Further, the dough-enrobed foodstuff remains crisp even when cold. The thermally processed dough-enrobed foodstuff remains crisp even after multiple occurrences of refrigeration and reheating. Surprisingly, when reconstituting the dough-enrobed foodstuff in a microwave oven, heat susceptors are not required to obtain a very crisp texture. In fact, the crispness of the dough-enrobed foodstuff of the present invention reconstituted in a microwave oven, without the use of heat susceptors, is equal to the texture of a dough-enrobed foodstuff reconstituted in a conventional oven. Accordingly, less expensive packaging is required and any concern for food contamination from food packaging components is reduced. Also, the end consumer may reconstitute the dough-enrobed foodstuff in less time using the microwave oven instead of a conventional oven while obtaining substantially similar organoleptic properties to reconstituting in a conventional oven.

Moreover, dough-enrobed foodstuffs coated with a coating composition of the present invention substantially retain the filling or other consumable or mixture of consumables. During thermal processing and upon reconstitution, prior foodstuffs would often leak filling out of a crack in the dough and the filling would spill out of the foodstuff. This routinely occurs in, for example, pizza rolls. The filling heats up whether thermally processed in heated oil or reconstituted in a conventional oven, a toaster oven, or in a microwave oven and the filling breaks through the dough and spills out of the foodstuff and into the heated oil or onto the cookie sheet, plate, or tray holding the dough-enrobed foodstuff. It is presently believed that the filling bubbles or bursts and expands until it breaks through the weakest dough seal in the dough-enrobed foodstuff. Surprisingly, Applicant has discovered that the coating compositions of the present invention strengthen the dough-enrobed foodstuff and at least substantially prevent, more typically completely prevent, the loss of filling from the interior of the foodstuff upon thermal processing and subsequent reconstitution.

EXAMPLES

The following Examples more precisely and particularly illustrate the specific details of the coated dough-enrobed foodstuffs of the present invention. Equivalent procedures and quantities will occur to those skilled in the art and, therefore, the following Examples are not meant to define the limits of the present invention, these being defined by the scope of the appended claims.

Example 1

A dough-enrobed foodstuff with a coating composition of the present invention applied to the external surface of the foodstuff in the form of a wet slurry was formed. The coating composition was substantially clear upon thermal processing and provided a crisp surface on the foodstuff.

First, standard frozen pizza rolls were removed from a retail package and allowed to thaw. The surface of the pizza rolls were then dried with a paper towel. A coating composition of the present invention in the form of a wet slurry was prepared with the following general formula:

| Ingredient | Percentage by weight of Formula |
|---|---|
| Crosslinked potato starch (about 20% or less amylose) | 46.88% |
| Corn dextrin (about 25% or less amylose) | 44.00% |
| 120 U.S. Mesh size rice flour (about 19% or less amylose) | 6.00% |
| Salt | 3.00% |
| Xanthan gum (stabilizer) | 0.12% |

The solids content of the coating composition was about 46% with a viscosity of about 13.2 Stein Cup seconds. The thawed, dried pizza rolls were dipped into the coating composition, having a temperature of about 19° C. (66° F.), and allowed to drip to remove excess coating composition. The coated pizza rolls were then placed in a fryer with cooking oil, typically vegetable oil, heated to a temperature of about 177° C. (350° F.) and fried for about 30 seconds. The coated, fried pizza rolls were allowed to cool and then placed into a freezer until frozen. The frozen pizza rolls were packed into their original retail pack and stored in the freezer at least overnight. The frozen pizza rolls were then reconstituted using a conventional oven and a microwave oven according to package directions. The resulting pizza rolls were crispier than the uncoated pizza rolls for both methods of reconstitution and little if any of the filling emerged from the coated, reconstituted pizza rolls.

Example 2

In this Example, a dough-enrobed foodstuff with increased crispness was prepared by adding the coating composition of Example 1 as a dry additive to the dough. First, a dough was prepared and about 15% by dry weight of the raw dough of the clear coating composition was added to the other dough ingredients. The dough was rolled out using an AL DENTE" pasta machine manufactured by VILLA WARE® of Cleveland, Ohio, set at a thickness of 2 millimeters (size setting No. 5). The flattened dough was then cut into about 3.8 centimeters (1.5 inches) wide strips. Approximately 5 grams of tomato-based pizza flavored filling and cheese were placed on one end of the flattened dough and the flattened dough was lightly sprayed with water. The dough strips were folded over the filling and the edges pressed to seal. The edges were then trimmed so the dough-enrobed foodstuff weighed from about 10 grams to about 12 grams. The dough-enrobed foodstuff was then placed in a fryer of heated oil, heated to about 185° C. (365° F.) and fried for about 120 seconds. The fried pizza rolls were allowed to cool and then placed into a freezer until frozen. The frozen pizza rolls were packed into an original retail pack and stored in the freezer at least overnight. The frozen pizza rolls were reconstituted by a conventional oven according to package directions.

The addition of a coating composition of the present invention to the dough improved the dough texture by increasing crispness. However, the increased crispness was not as significant as when the coating composition was applied to the surface of the dough-enrobed foodstuff.

Example 3

A dough-enrobed foodstuff with a coating composition of the present invention applied in dry form to the external surface of a raw dough-enrobed foodstuff was formed. The coating composition was substantially clear upon thermal processing and provided increased crispness to the surface of the foodstuff.

The coating composition of Example 1 in dry form was dusted onto both sides of raw pizza rolls. As a comparison, raw pizza rolls were dusted on both sides with potato dextrin only and pregelatinized, modified tapioca starch only. Water mist was then sprayed onto the surface of both sides. The coated, raw pizza rolls were placed in a fryer of oil heated to about 185° C. (365° F.) and fried for about 120 seconds. As a control, uncoated, raw pizza rolls were thermally processed in the same manner. The fried pizza rolls were allowed to cool and then placed into a freezer until frozen. The frozen pizza rolls were packed into the original retail pack and stored in the freezer at least overnight. The coated frozen pizza rolls were reconstituted by baking in an about 218° C. (425° F.) conventional oven for about 9 minutes. Pizza rolls were also prepared as above, but with no water misting.

Dusting the surface of the raw dough of the dough-enrobed foodstuff with the coating composition of Example 1 in dry form created an invisible coating, but the texture and flavor were similar to that of the control. Dusting the surface of the raw dough with at least about 100% or 100% pregelatinized, modified tapioca starch having an amylose content of about 17% or less in dry form improved the texture by increasing crispness and is also acceptable. Water misting the raw dough after coating with the tapioca starch resulted in increased crispness compared to pizza rolls prepared without water misting.

Dusting the surface of the raw dough of the dough-enrobed foodstuff with about 100% by weight potato dextrin (a potato dextrin where preferably less than about 50%, more preferably less than about 32%, and most preferably less than about 15% of the dextrin is soluble when placed in or washed with cold water (about 25° C. (77° F.)) sufficient to solubilize all of soluble dextrin in dry form increased the crispness of the foodstuff and is the preferred coating composition used when dry dusting the dough-enrobed foodstuff. However, the dry dusted thermally processed foodstuff was not as crisp as the thermally processed foodstuff coated using a coating composition in the form of a wet slurry. The use of a subsequent water spray created a more continuous coating and improved the coating's performance because the misting allowed for partial solubilization of the dextrin. Dusting, however, created a slightly more visible coating than slurry coating a dough-enrobed foodstuff because some small particles remained insoluble when water-misted, but was also substantially clear upon thermal processing.

Example 4

A coating composition of the present invention in the form of a wet slurry was applied to the surface of a raw dough-enrobed foodstuff. The coating composition was substantially clear upon thermal processing and provided increased crispness to the surface of the foodstuff.

First, raw pizza rolls were prepared as in Example 2. The coating composition of Example 1 was applied as a wet slurry onto both sides of the raw pizza rolls. The solids content of the coating composition was about 46%. The percent pickup was from about 9% to about 13%. The coated, raw pizza rolls were then placed in a fryer with heated oil, typically vegetable oil, heated to about 185° C. (365° F.) for about 120 seconds. The fried pizza rolls were allowed to cool and then were placed into a freezer until frozen. The frozen pizza rolls were packed into an original retail pack and stored in the freezer at least overnight.

The pizza rolls were reconstituted using a conventional oven and were baked at a temperature of about 232° C. (450° F.) for about 9 minutes. The resulting pizza rolls were crispier than uncoated pizza rolls and were as crispy as those prepared in Example 1.

Example 5

A dough-enrobed foodstuff with a coating composition of the present invention applied to the external surface of the foodstuff in the form of a wet slurry was formed. The coating composition was substantially clear upon thermal processing and provided a crisp surface on the foodstuff. The thermally processed, coated dough-enrobed foodstuff contains less fat than a thermally processed, uncoated dough-enrobed foodstuff.

A coating composition of the present invention in the form of a wet slurry was prepared with the following general formula:

| Ingredient | Percentage of Formula (by weight) |
| --- | --- |
| Crosslinked potato starch (about 20% or less amylose) | 52.4% |
| An approximate 50:50 blend of an acetylated corn starch and an oxidized corn starch (about 25% or less amylose) | 40.0% |

-continued

| Ingredient | Percentage of Formula (by weight) |
|---|---|
| Corn dextrin (about 25% or less amylose) | 5.2% |
| Salt | 2.0% |
| Xanthan gum (stabilizer) | 0.4% |

The solids content of the coating composition was about 20% by weight of the slurry.

A dough was prepared using the following general formula:

| Ingredient | Weight (grams) |
|---|---|
| All-purpose flour | 295 g |
| Egg | 46 g |
| Salt | 7 g |
| Ice water | 123 g |

Standard frozen pizza rolls were removed from a retail package and allowed to thaw. The filling was removed from the pizza rolls, placed in a food processor, and comminuted into a homogeneous slurry.

The dough was rolled as in Example 2. The flattened dough was cut into rectangles measuring about 3.8 centimeters (1.5 inches) by about 9.9 centimeters (3.5 inches). From approximately 5.9 grams to about 6.1 grams of tomato-based, pizza-flavored filling, which previously had been removed from the standard pizza rolls, were placed on one end of the flattened rectangular dough. The flattened dough was lightly moistened on the inside edges of the dough surrounding the pizza-flavored filling. The dough strips were folded over the filling and the edges pressed to seal. The dough-enrobed foodstuff was then dipped into the coating composition having a temperature of about 19° C. (66° F.), and allowed to drip for about 10 seconds to remove excess coating composition. The percent pickup of the coating composition was from about 6.9% to about 7.4%. The coated, dough-enrobed foodstuff was then placed in a fryer with cooking oil, typically vegetable oil, heated to a temperature of about 185° C. (365° F.) for about 50 seconds. The coated, fried dough-enrobed foodstuff was allowed to cool and then placed into a freezer until frozen. The resulting fried dough-enrobed foodstuff was crispier and had from about 5% to about 9.7% less fat than an uncoated, fried dough-enrobed foodstuff.

The coated pizza rolls were reconstituted in a 1200 watt domestic microwave for 60 seconds and then allowed to cool for 60 seconds. The cooled, coated pizza rolls were then evaluated for organoleptic properties using Quantitative Descriptive Analysis (QDA).

QDA is a standard method in the art for determining differences in sensory attributes of food products. Trained panelists are used to score a well-defined attribute on a scale of 1 to 15. Panelists evaluate each product independently and do not discuss data, terminology, or samples after each taste session. The data may be reported in graphic representation in the form of a "spider web" where a branch from the center point represents the intensity of the attribute. The mean intensity score calculated from the panelists' evaluations for each attribute is used to assemble the graph.

The sensory attributes measured include crispness, tenderness, tooth compaction, audible crunch, chew down, and hardness. Crispness measures to what degree the food being tested easily crumbled when bitten. Tenderness measures the ease of bite. Tooth compaction measures the amount of chewed food adhered to teeth. Audible crunch measures the sound made on biting and chewing. Chew down measures the amount of energy required to masticate a single bite. Hardness measures the roughness of surface on the roof of the panelists' mouth during mastication.

The QDA results for a microwave reconstituted pizza roll coated with the coating composition of Example 5 are as follows:

| Sensory Attribute | QDA Score |
|---|---|
| Crispness | 14 |
| Tenderness | 8 |
| Tooth Compaction | 7 |
| Audible Crunch | 11 |
| Chew Down | 12 |
| Hardness | 10 |

These scores are graphically represented in the "spider web" graph shown as FIG. 1.

As reflected in the QDA scores (above) and graphical representation, upon reconstitution, the coated pizza rolls were very crisp with a clearly audible crunch.

Example 6

In this Example, a dough-enrobed foodstuff with the coating composition of Example 5, applied as a wet slurry to the external surface of a raw dough-enrobed foodstuff, was formed. The coating composition was substantially clear upon thermal processing and provided increased crispness to the surface of the foodstuff. The thermally processed, coated dough-enrobed foodstuff contained less fat than a thermally processed, uncoated dough-enrobed foodstuff.

The filling, dough, and dough-enrobed foodstuff were prepared as in Example 5. The coating composition of Example 5 was applied in the form of a wet slurry to the external surface of the dough-enrobed foodstuff. The solids content of the coating composition was about 15% by weight of the slurry. The percent pickup was about 4.5% to about 5.4%. The coated dough-enrobed foodstuff was allowed to drip for about 10 seconds to remove excess coating composition. The coated dough-enrobed foodstuff was thermally processed and frozen as in Example 5. The resulting fried dough-enrobed foodstuff was crispier and had from about 7.8% to about 10.5% less fat than an uncoated, fried dough-enrobed foodstuff.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:
1. A method of making a food product comprising:
providing a dough-enrobed foodstuff comprising dough at least substantially enclosing a filling wherein the dough-enrobed foodstuff is a pizza roll;
at least partially coating the foodstuff with a clear coating composition comprising:
salt;
a modified food starch having an amylose content of less than about 50% based on the weight of the modified food starch; and
a dextrin wherein less than about 50% of the dextrin is soluble in about 25° C. (77° F.) water;

at least partially parfrying the coated foodstuff such that the clear coating composition becomes visually unnoticeable and wherein substantially all of the filling remains enclosed within the dough-enrobed foodstuff upon at least partially parfrying; and freezing the at least partially parfried foodstuff, wherein substantially all of the filling remains enclosed within the dough-enrobed foodstuff upon reconstituting the frozen foodstuff by thermally processing the frozen foodstuff using a conventional oven, a toaster oven, or a microwave oven.

2. The method of making a food product of claim 1, wherein the clear coating composition comprises from about 30% to about 60% of a modified food starch; and from about 30% to about 60% of a dextrin; and wherein the clear coating composition further comprises:
from about 4% to about 16% of a rice flour having an amylose content of less than about 35% based on the weight of the rice flour;
from about 1% to about 6% salt; and
from about 0.05% to about 1% of a stabilizer,
where all amounts are the percent by weight of the total dry solids of the clear coating composition.

3. The method of making a food product of claim 2, wherein the clear coating composition is gluten-free and the coating composition is free of starches that have been altered to enhance their amylose content.

4. The method of making a food product of claim 2, wherein the modified food starch comprises a modified potato starch and the dough comprises wheat flour, and wherein the dough encloses the filling.

5. The method of making a food product of claim 4, wherein the dextrin comprises a corn dextrin, and wherein the dough-enrobed foodstuff is a pizza roll having a tomato-based, pizza-flavored filling.

6. The method of making a food product of claim 5, wherein the clear coating composition comprises:
from about 45% to about 49% of a modified potato starch;
from about 42% to about 46% of a corn dextrin;
from about 5% to about 7% of a rice flour;
from about 2.5% to about 3.5% salt; and
from about 0.1% to about 0.2% of a stabilizer.

7. The method of making a food product of claim 6, wherein the corn dextrin comprises a dextrin wherein less than about 32% of the dextrin is soluble in about 25° C. (77° F.) water.

8. The method of making a food product of claim 6, wherein the rice flour comprises an about U.S. 100 mesh size or finer commercial size rated rice flour and a second rice flour component.

9. The method of making a food product of claim 8, wherein the rice flour comprises an about U.S. 120 mesh size or finer commercial size rated rice flour.

10. The method of making a food product of claim 1, wherein the modified food starch comprises crosslinked potato starch and the dextrin comprises corn dextrin; wherein the clear coating composition further comprises rice flour, salt and a stabilizer; and wherein the dry solids of the clear coating composition consists of:
from about 45% to about 49% crosslinked potato starch;
from about 42% to about 46% corn dextrin;
from about 5% to about 7% rice flour;
from about 2.5% to about 3.5% salt; and
from about 0.1% to about 0.2% stabilizer.

11. The method of making a food product of claim 1, wherein the rice flour comprises an about U.S. 120 mesh size or finer commercial size rated rice flour.

12. The method of making a food product of claim 1, wherein the clear coating composition comprises a dry coating composition and further comprises the step of applying a water mist sufficient to at least partially solubilize the clear coating composition after the clear coating composition is applied to the surface of the dough-enrobed foodstuff.

13. The method of making a food product of claim 1, wherein the coating composition is free of gluten.

14. A method of making a food product comprising:
providing a dough-enrobed foodstuff comprising dough at least substantially enclosing a filling wherein the dough-enrobed foodstuff is a pizza roll;
at least partially coating the foodstuff with a clear coating composition comprising:
from about 90% to about 95% of a modified food starch having an amylose content of less than about 50% based on the weight of the modified food starch;
from about 4% to about 10% of a dextrin wherein less than about 50% of the dextrin is soluble in about 25° C. (77° F.) water;
from about 1% to about 3% salt; and
from about 0.1% to about 0.3% of a stabilizer where all amounts are the percent by weight of the total dry solids of the clear coating composition; and
at least partially parfrying the coated foodstuff such that the clear coating composition becomes visually unnoticeable and wherein substantially all of the filling remains enclosed within the dough-enrobed foodstuff upon at least partially parfrying.

15. The method of making a food product of claim 14, wherein the modified food starch comprises a mixture of a modified potato starch and a modified corn starch and wherein the dextrin comprises a corn dextrin, wherein the dough comprises wheat flour, and wherein the dough-enrobed foodstuff is a pizza roll having a tomato-based, pizza-flavored filling.

16. The method of making a food product of claim 15, wherein the dry solids of the clear coating composition comprises:
from about 51% to about 53% modified potato starch;
from about 39% to about 41% modified corn starch;
from about 5% to about 6% corn dextrin;
from about 1.5% to about 2.5% salt; and
from about 0.1% to about 0.7% stabilizer.

17. The method of making a food product of claim 14, wherein the coating composition is free of gluten.

18. A method of making a pizza roll comprising:
providing a dough-enrobed foodstuff that is a pizza roll that comprises a tomato-based, pizza-flavored filling at least substantially enclosed by a dough;
at least partially coating the pizza roll with a dry coating composition wherein the coating composition comprises salt and either at least about 100% of a potato dextrin wherein less than 50% of the dextrin is soluble in about 25° C. (77° F.) water or at least about 100% of a tapioca starch;
at least partially parfrying the coated pizza roll such that substantially all of the filling remains enclosed within the pizza roll upon parfrying; and
freezing the at least partially thermally processed pizza roll and thereafter reconstituting the frozen pizza roll by thermally processing the frozen pizza roll using a conventional oven, a toaster oven, or a microwave oven such that substantially all of the filling remains enclosed within the pizza roll upon reconstitution; and
wherein the dough comprises wheat flour and the coating composition becomes visually unnoticeable upon being parfried.

19. The method of making a pizza roll of claim 18, wherein the coating composition is free of gluten.

* * * * *

UNITED STATES PATENT AND TRADEMARK OFFICE
CERTIFICATE OF CORRECTION

| | | |
|---|---|---|
| PATENT NO. | : 7,998,512 B1 | Page 1 of 1 |
| APPLICATION NO. | : 11/333681 | |
| DATED | : August 16, 2011 | |
| INVENTOR(S) | : Cheree L. B. Stevens | |

It is certified that error appears in the above-identified patent and that said Letters Patent is hereby corrected as shown below:

In the Specifications:

Column 2, line 67;
    "cassaya" should be --cassava--.

Column 9, line 8;
    "AL DENTE"" should be --AL DENTE™--.

Signed and Sealed this
Twenty-third Day of April, 2013

Teresa Stanek Rea
*Acting Director of the United States Patent and Trademark Office*